United States Patent [19]
Tsuchiya et al.

[11] Patent Number: 5,849,067
[45] Date of Patent: Dec. 15, 1998

[54] INK COMPOSITIONS FOR INK-JET RECORDING

[75] Inventors: Tatsurou Tsuchiya; Shigeru Ohtsuka; Masashi Fujiwara; Hiroyuki Ishikawa, all of Osaka, Japan

[73] Assignee: Sakata Inx Corp., Osaka, Japan

[21] Appl. No.: 838,335

[22] Filed: Apr. 8, 1997

[30] Foreign Application Priority Data

Apr. 9, 1996 [JP] Japan ............................ 8-086260
Mar. 12, 1997 [JP] Japan ............................ 9-057314

[51] Int. Cl.⁶ ................................................ C09D 11/02
[52] U.S. Cl. ................................... 106/31.86; 106/31.89
[58] Field of Search .......................... 106/31.86, 31.89, 106/31.6

[56] References Cited

U.S. PATENT DOCUMENTS

| | | | |
|---|---|---|---|
| 4,986,850 | 1/1991 | Iwata et al. ................... | 106/31.58 |
| 5,106,417 | 4/1992 | Hauser et al. .................. | 106/31.86 |
| 5,169,437 | 12/1992 | You .............................. | 106/31.86 |
| 5,180,425 | 1/1993 | Matrick et al. ................ | 106/31.58 |
| 5,254,158 | 10/1993 | Breton et al. ................. | 106/31.58 |
| 5,281,262 | 1/1994 | Saito ............................ | 106/31.86 |
| 5,302,197 | 4/1994 | Wickramanayake et al. ..... | 106/31.76 |
| 5,356,464 | 10/1994 | Hickman et al. ............... | 106/31.75 |
| 5,656,071 | 8/1997 | Kappele et al. ............... | 106/31.86 |

FOREIGN PATENT DOCUMENTS

| | | |
|---|---|---|
| 0 211 278 | 2/1987 | European Pat. Off. . |
| 2 680 513 | 2/1993 | France . |
| 3-152170 | 6/1991 | Japan . |
| 4-18465 | 1/1992 | Japan . |
| 5-214282 | 8/1993 | Japan . |

OTHER PUBLICATIONS

Summary of Disclosure for Japanese Patent Application Public Disclosure 214282/93, Aug. 1993.
Summary of Disclosure for Japanese Patent Application Public Disclosure 18465/92, Jan. 1992.
Summary of Disclosure for Japanese Patent Application Public Disclosure 152170/91, Jun. 1991.
European Search Report for EP Application 97 30 2429, Jul. 1997.

*Primary Examiner*—Helene Klemanski
*Attorney, Agent, or Firm*—Banner & Witcoff, Ltd.

[57] ABSTRACT

The invention relates to ink compositions for ink-jet recording which can avoid clogging of nozzles. An ink composition for ink-jet recording comprising a pigment and a compound containing 5 to 90 moles of ethylene oxide per 1 mole of polyglycerin having a polymerization degree of 2 to 10 in an aqueous medium is provided.

13 Claims, No Drawings

INK COMPOSITIONS FOR INK-JET RECORDING

BACKGROUND OF THE INVENTION

This invention relates to ink compositions for ink-jet recording, more specifically ink compositions for ink-jet recording which are suitable for use in ink-jet recording apparatus wherein recording takes place with an ink flown from an orifice of a recording head. The ink compositions of the invention avoid clogging of nozzles.

In recent years, research has been devoted to the development of ink-jet recording systems for applications in various types of printers, copiers, facsimiles, etc., because they operate with low noise during recording and provide high resolution images at a high speed by using highly integrated heads.

In the subject ink-jet recording system, recording takes place by means of droplets of an ink composition for ink-jet recording which are deposited on an intended material. Said ink composition for ink-jet recording comprises a dye or pigment and an aqueous medium (water and/or water-miscible solvent) for dissolving or dispersing, and optionally an aqueous resin and/or additives. Such a recording system includes various modes with different manners of forming droplets or controlling the direction in which droplets are flown. For example, droplets to be flown can be formed by applying pressure on an ink composition for ink-jet recording by means of a piezooscillator, or by applying an electrostatic field to an ink composition for ink-jet recording to take advantage of the resulting attraction force, or applying heat energy to an ink composition for ink-jet recording to take advantage of the resulting pressure, or other means.

In order to accomplish good recording, the ink composition for ink-jet recording used must have optimal physical properties such as viscosity, surface tension, specific resistivity, dielectric constant, etc., depending on the manner of forming droplets or controlling the direction in which droplets are flown. In any event, the ink composition for ink-jet recording must not form solids by evaporation of a liquid medium or change in the constitution of components during long term storage or suspension of recording. Nozzles of ink-jet recording apparatus are generally minute orifices (about 50 $\mu$m in diameter) which can become clogged with solids thus preventing ejection of droplets. Even if ejection were not caused to stop, formation of such solids would adversely affect the formation of homogeneous droplets or stable flying of droplets, thus lowering ejection stability and ejection responsivity as well as image quality. The term "ejection stability (also referred to as ink ejectability)" means a performance in that, when the ink composition for ink-jet recording is continuously ejected from the nozzle, proper droplets are formed and flown and unejection is not observed. The term "ejection responsivity (also referred to as long term uncapped performance)" means a performance in that, when printing is performed again after the nozzle has been left uncapped for a several days, proper droplets are ejected from the beginning. A chemical change of components of the ink composition for ink-jet recording would cause a fluctuation in the physical properties of the ink composition for ink-jet recording adjusted at desired values during formulation, thus also lowering ejection stability and ejection responsivity as well as image quality.

At present, dyes are commonly used as coloring materials for ink compositions for ink-jet recording, but many of them are insufficient in water fastness and light fastness for printed images. Thus, there is a demand for ink compositions for ink-jet recording using a pigment having good water fastness and light fastness. Pigments tend to cause clogging of nozzles, and are therefore not generally employed.

Japanese Patent Public Disclosure No. 152170/91 discloses ink-jet recording liquids containing polyglycerin. This publication only specifically describes ink-jet recording liquids containing a dye, but does not specifically describe those containing a pigment. Although ink compositions comprising a compound wherein ethylene oxide or propylene oxide is added to a polyhydric alcohol such as glycerin have been previously known (for example, Japanese Patent Public Disclosure No. 18465/92), sufficient effects have not been obtained yet to prevent clogging of nozzles.

SUMMARY OF THE INVENTION

An object of this invention is to solve the foregoing problems and to provide ink compositions for ink-jet recording which avoid clogging of nozzles.

After exhaustive studies to solve the above problems, the inventors have found that these problems can be solved by using ink compositions for ink-jet recording comprising a compound containing 5 to 90 moles of ethylene oxide per 1 mole of polyglycerin having a polymerization degree of 2 to 10, and thus finally accomplished the present invention.

Accordingly, the present invention relates to an ink composition for ink-jet recording comprising a pigment and a compound containing 5 to 90 moles of ethylene oxide per 1 mole of polyglycerin having a polymerization degree of 2 to 10 in an aqueous medium. The invention also relates to an ink composition for ink-jet recording comprising a pigment, an aqueous resin and a compound containing 5 to 90 moles of ethylene oxide per 1 mole of polyglycerin having a polymerization degree of 2 to 10 in an aqueous medium. Further, the invention relates to an ink composition for ink-jet recording wherein said compound containing 5 to 90 moles of ethylene oxide per 1 mole of polyglycerin consists in an amount ranging from 0.5 to 30% by weight on the basis of the total weight of the ink composition for ink-jet recording.

DETAILED DESCRIPTION OF THE PREFERRED EMBODIMENTS

The invention will be further described below in detail.

The compound wherein ethylene oxide is added to polyglycerin used in ink-jet compositions for ink-jet recording according to this invention may contain 5 to 90 moles, preferably 10 to 40 moles of ethylene oxide per 1 mole of polyglycerin. If less than 5 moles of ethylene oxide are added, the ejection responsivity will be lowered. If more than 90 moles of ethylene oxide are added, the ink viscosity will increase or the fluidity will be lowered to jeopardize usability.

The polymerization degree of said polyglycerin is preferably in the range of about 2 to 10.

The compound wherein ethylene oxide is added to polyglycerin can be used in an amount of 0.5 to 30% by weight, preferably 2 to 20% by weight, more preferably 3 to 15% by weight on the basis of the total weight of the ink composition for ink-jet recording. If the amount is less than 0.5% by weight, clogging of nozzles can not be prevented and therefore the ejection responsivity can not be maintained. If the amount is more than 30% by weight, the ink viscosity will unnecessarily increase or the fluidity will be lowered.

The pigment used in ink compositions for ink-jet recording according to this invention may be any of known inorganic or organic pigments which are dispersible in an aqueous medium, and especially preferred are those readily wettable in an aqueous medium by surface treatment.

Inorganic pigments which may be used include titanium dioxide, red iron oxide, antimony red, cadmium red, cadmium yellow, cobalt blue, Prussian blue, ultramarine blue, carbon black, graphites, etc., and organic pigments include soluble azo pigments, insoluble azo pigments, azo lake pigments, condensed azo pigments, copper phthalocyanine pigments, condensed polycyclic pigments, etc.

The pigment may be used in an amount of 1 to 30% by weight, preferably 2 to 10% by weight on the basis of the total weight of the ink composition for ink-jet recording. If the amount is too small, the color concentration will be lowered. If the amount is too large, however, the ink viscosity will increase or the fluidity will be lowered.

The aqueous medium used in ink compositions for ink-jet recording according to this invention may be water or water-miscible solvents which have been commonly used in the technical field to which this invention belongs.

Water-miscible solvents include lower alcohols, polyhydric alcohols and their derivatives, nitrogen-containing cyclic compounds, etc.

Specific examples are lower alcohols such as methanol, ethanol, normal propanol, isopropanol; polyhydric alcohols such as ethylene glycol, propylene glycol, diethylene glycol, dipropylene glycol, glycerin; polyhydric alcohol derivatives such as ethylene glycol monomethyl ether, ethylene glycol monoethyl ether, propylene glycol monoethyl ether, propylene glycol monomethyl ether, propylene glycol acetate, diethylene glycol monomethyl ether, dipropylene glycol monomethyl ether; nitrogen-containing cyclic compounds such as N-methylpyrrolidone, N-ethylpyrrolidone, etc.

Water-miscible solvents such as acetone or ethyl acetate are not preferable because they may damage printers.

If the resulting printed matters should have high fixability and water fastness or if the ink composition for ink-jet recording should have a high pigment-dispersibility, the ink composition for ink-jet recording may also include an aqueous resin or a basic compound used for dissolving or dispersing the aqueous resin into an aqueous medium, if desired.

The aqueous resin may be such as is commonly used in the technical field to which this invention belongs.

Specific examples include the aqueous resins mentioned in Japanese Patent Application No. 255223/95 filed by the present applicant, acrylic alkyl ester-(meth)acrylic acid copolymers, styrene-acrylic acid copolymers, styrene-acrylic acid-acrylic alkyl ester copolymers, styrene-maleic acid copolymers, styrene-maleic acid-acrylic alkyl ester copolymers, styrene-methacrylic acid copolymers, styrene-methacrylic acid-acrylic alkyl ester copolymers, styrene-maleic acid half ester copolymers, etc., which have a weight average molecular weight in the range of 5000 to 30000. Especially preferred are copolymers of a (meth)acrylic ester having an alkyl group having 8 to 20 carbon atoms, a (meth)acrylic ester having an alkyl group having 1 to 7 carbon atoms and (meth)acrylic acid.

The aqueous resin desirably exists in an amount ranging from 0.1 to 20% by weight, preferably 0.2 to 10% by weight on the basis of the ink composition for ink-jet recording.

The basic compound for dissolving an aqueous resin into an aqueous medium includes alkaline metal hydroxides such as NaOH, KOH; alkylamines such as butylamine, triethylamine; alkanolamines such as monoethanolamine, diethanolamine, triethanolamine; morpholine; ammonia water, etc.

Ink compositions for ink-jet recording according this invention may also include various additives such as surfactants, pigment dispersants, viscosity controllers, defoamers, etc., if desired.

Ink compositions for ink-jet recording can be prepared with the above described components by a process comprising the steps of mixing a pigment, a compound wherein ethylene oxide is added to polyglycerin, an aqueous medium, and if desired, an aqueous resin, basic compound, surfactant, pigment dispersant, viscosity controller, defoamer, etc., then dispersing the pigment by means of any of various dispersing machines such as ball mill, roll mill, sand mill, and adding and mixing the remainder of the materials.

In this invention, a desired particle size distribution can be given to the pigment by using grinding media of a small size or at a high filling ratio in the dispersing media, or prolonging the treatment period, or lowering the treatment speed, or classifying particles through a filter or centrifuge after dispersion, or other means.

This invention will now be illustrated by way of examples, but these examples should not be construed as limiting this invention. In the following examples, "parts" means "parts by weight" unless otherwise indicated.

EXAMPLES

Example 1

After 5.0 parts of carbon black (C.I. Pigment Black 7, product of Mitsubishi Chemical Corp.), 0.5 parts of a nonionic pigment dispersant, 5.7 parts of a compound wherein 5 moles of ethylene oxide are added to polyglycerin (polymerization degree: 4), 6.0 parts of diethylene glycol and 8.1 parts of ion exchange water were premixed for one hour, the pigment was dispersed by means of a sand mill according to a conventional method. Then 74.7 parts of ion exchange water were further added to give an ink composition for ink-jet recording 1.

Example 2

After a four-necked flask equipped with a stirrer, a condenser tube and a nitrogen gas inlet tube was charged with 350 parts of ethyl acetate and heated to 75 to 85° C., a mixture of 25 parts of methacrylic stearate, 37.5 parts of methacrylic acid, 187.5 parts of methyl methacrylate and 2.5 parts of di-tertiary butyl peroxide was added dropwise for 2 hours while nitrogen gas was introduced. The mixture was polymerized for 2 hours at the same temperature, and then the solvent was distilled off under reduced pressure to give an acrylic resin having a weight average molecular weight of 11000.

A reaction vessel was charged with 90 parts of acrylic resin thus obtained, 12 parts of dimethyl ethanolamine and 250 parts of ion exchange water and warmed to 70° C. in a water bath under stirring to allow the contents to be heat-molten into a water-soluble resin varnish.

After 4.0 parts of said water-soluble resin varnish, 5.0 parts of carbon black (C.I. Pigment Black 7, product of Mitsubishi Chemical Corp.), 5.7 parts of a compound wherein 20 moles of ethylene oxide are added to polyglycerin (polymerization degree: 4), 6.0 parts of diethylene glycol and 8.1 parts of ion exchange water were premixed for one hour, the pigment was dispersed by means of a sand mill according to a conventional method. Then 71.2 parts of ion exchange water were further added to give an ink composition for ink-jet recording 2.

Example 3

The procedure of Example 2 was followed except that 5.7 parts of a compound wherein 20 moles of ethylene oxide are added to polyglycerin (polymerization degree: 4) were replaced by 5.7 parts of a compound wherein 5 moles of ethylene oxide are added to polyglycerin (polymerization degree: 4) to give an ink composition for ink-jet recording 3.

Example 4

The procedure of Example 2 was followed except that 5.7 parts of a compound wherein 20 moles of ethylene oxide are added to polyglycerin (polymerization degree: 4) were replaced by 5.7 parts of a compound wherein 90 moles of ethylene oxide are added to polyglycerin (polymerization degree: 4) to give an ink composition for ink-jet recording 4.

Example 5

The procedure of Example 2 was followed except that 5.7 parts of a compound wherein 20 moles of ethylene oxide are added to polyglycerin (polymerization degree: 4) were replaced by 5.7 parts of a compound wherein 20 moles of ethylene oxide are added to polyglycerin (polymerization degree: 2) to give an ink composition for ink-jet recording 5.

Example 6

The procedure of Example 2 was followed except that 5.7 parts of a compound wherein 20 moles of ethylene oxide are added to polyglycerin (polymerization degree: 4) were replaced by 5.7 parts of a compound wherein 20 moles of ethylene oxide are added to polyglycerin (polymerization degree: 6) to give an ink composition for ink-jet recording 6.

Example 7

The procedure of Example 2 was followed except that 5.7 parts of a compound wherein 20 moles of ethylene oxide are added to polyglycerin (polymerization degree: 4) were replaced by 5.7 parts of a compound wherein 20 moles of ethylene oxide are added to polyglycerin (polymerization degree: 10) to give an ink composition for ink-jet recording 7.

Example 8

The procedure of Example 2 was followed except that 5.0 parts of carbon black were replaced by 5.0 parts of copper phthalocyanine blue (C.I. Pigment Blue 15:3, product of Dainippon Ink and Chemicals, Inc.) to give an ink composition for ink-jet recording 8.

Example 9

The procedure of Example 2 was followed except that 5.0 parts of carbon black were replaced by 5.0 parts of dimethyl quinacridone (C.I. Pigment Red 122, product of Dainippon Ink and Chemicals, Inc.) to give an ink composition for ink-jet recording 9.

Example 10

The procedure of Example 2 was followed except that 5.0 parts of carbon black were replaced by 5.0 parts of dis-azo yellow (C.I. Pigment Yellow 83, product of Hoechst AG) to give an ink composition for ink-jet recording 10.

Example 11

The procedure of Example 2 was followed except that 6.0 parts of diethylene glycol were replaced by 6.0 parts of a compound wherein 20 moles of ethylene oxide are added to polyglycerin (polymerization degree: 4) to give an ink composition for ink-jet recording 11.

Example 12

After 4.0 parts of the water-soluble resin varnish prepared in Example 2, 5.0 parts of carbon black (C.I. Pigment Black 7, product of Mitsubishi Chemical Corp.), 20.0 parts of a compound wherein 20 moles of ethylene oxide are added to polyglycerin (polymerization degree: 4) and 5.0 parts of ion exchange water were premixed for one hour, the pigment was dispersed by means of a sand mill according to a conventional method. Then 66.0 parts of ion exchange water were further added to give an ink composition for ink-jet recording 12.

Comparative Example 1

The procedure of Example 2 was followed except that 5.7 parts of a compound wherein 20 moles of ethylene oxide are added to polyglycerin (polymerization degree: 4) were replaced by 5.7 parts of a compound wherein 3 moles of ethylene oxide are added to polyglycerin (polymerization degree: 4) to give an ink composition for ink-jet recording 13.

Comparative Example 2

The procedure of Example 2 was followed except that 5.7 parts of a compound wherein 20 moles of ethylene oxide are added to polyglycerin (polymerization degree: 4) were replaced by 5.7 parts of a compound wherein 95 moles of ethylene oxide are added to polyglycerin (polymerization degree: 4) to give an ink composition for ink-jet recording 14.

Comparative Example 3

The procedure of Example 1 was followed except that 5.7 parts of a compound wherein 5 moles of ethylene oxide are added to polyglycerin (polymerization degree: 4) were replaced by diethylene glycol to give an ink composition for ink-jet recording 15.

Evaluation of Examples 1 to 12 and Comparative Examples 1 to 3.

The ink compositions for ink-jet recording 1 to 15 obtained in Examples 1 to 12 and Comparative Examples 1 to 3 were subjected to an evaluation test for clogging of nozzles according to the following procedure. The results are shown in Table 1.

Clogging of nozzles

In a recording apparatus having on-demand type multiple heads wherein recording takes place by applying heat energy to recording liquid in the recording heads to form droplets, the heads were filled with each test ink composition and allowed to stand uncapped at an ambient temperature of 20° C. for 3 days to evaluate clogging of nozzles on the basis of the conditions under which printing was successful.

A: Printing was successful without cleaning nozzles;
B: Printing was successful after nozzles were cleaned once or twice;
C: Printing was successful after nozzles were cleaned 3 to 5 times;
D: Printing was successful after nozzles were cleaned 6 times or more;
E: Printing was impossible no matter how many times nozzles were cleaned.

TABLE 1

| | | Ink composition for ink-jet recording | Clogging of nozzles |
|---|---|---|---|
| Example | 1 | 1 | B |
| | 2 | 2 | A |
| | 3 | 3 | B |
| | 4 | 4 | A |
| | 5 | 5 | A |
| | 6 | 6 | A |
| | 7 | 7 | A |
| | 8 | 8 | A |
| | 9 | 9 | A |
| | 10 | 10 | A |
| | 11 | 11 | A |
| | 12 | 12 | A |
| Comparative Example | 1 | 13 | C |
| | 2 | 14 | C |
| | 3 | 15 | E |

Advantages of the Invention

As is apparent from the foregoing description by way of examples, the ink compositions for ink-jet recording to this invention can prevent clogging of nozzles even in the form of a pigment-dispersed type of aqueous ink, by using a compound wherein 5 to 90 moles of ethylene oxide are added to polyglycerin having a polymerization degree of 2 to 10.

What is claimed is:

1. An ink composition for ink-jet recording comprising a pigment and a compound containing 5 to 90 moles of ethylene oxide per 1 mole of polyglycerin having a polymerization degree of greater than 4 and less than or equal to 10, said pigment and said compound being dispersed in an aqueous medium.

2. The ink composition for ink-jet recording according to claim 1, wherein the compound containing 5 to 90 moles of ethylene oxide per 1 mole of polyglycerin consists in an amount ranging from 0.5 to 30% by weight on the basis of the total weight of the ink composition for ink-jet recording.

3. The ink composition for ink-jet recording according to claim 1, wherein said polyglycerin has a polymerization degree of 6 to 10.

4. An ink composition for ink-jet recording comprising a pigment, an aqueous resin and a compound containing 5 to 90 moles of ethylene oxide per 1 mole of polyglycerin having a polymerization degree greater than 4 and less than or equal to 10, said pigment and said compound being dispersed in an aqueous medium.

5. The ink composition for ink-jet recording according to claim 4, wherein the compound containing 5 to 90 moles of ethylene oxide per 1 mole of polyglycerin consists in an amount ranging from 0.5 to 30% by weight on the basis of the total weight of the ink composition for ink-jet recording.

6. The ink composition for ink-jet recording according to claim 4, wherein said aqueous resin is a copolymer of a (meth)acrylic ester having an alkyl group having 8 to 20 carbon atoms, a (meth)acrylic ester having an alkyl group having 1 to 7 carbon atoms and (meth)acrylic acid.

7. The ink composition for ink-jet recording to claim 4, wherein said polyglycerin has a polymerization degree of 6 to 10.

8. A method for printing by ink jet recording comprising deposition of an ink composition on a substrate, said ink composition comprising a pigment and a compound containing 5 to 90 moles of ethylene oxide per 1 mole of polyglycerin having a polymerization degree of 2 to 10, said pigment and compound being dispersed in an aqueous medium.

9. The method according to claim 8, wherein said polyglycerin has a polymerization degree of greater than 4 and less than or equal to 10.

10. The method according to claim 8, wherein said polyglycerin has a polymerization degree of 6 to 10.

11. A method for printing by ink-jet recording comprising deposition of an ink composition on a substrate, said ink composition a pigment, an aqueous resin and a compound containing 5 to 90 moles of ethylene oxide per 1 mole of polyglycerin having a polymerization degree of 2 to 10, said pigment and said compound being dispersed in an aqueous medium.

12. The method according to claim 11, wherein said polyglycerin has a polymerization degree of greater than 4 and less than or equal to 10.

13. The method according to claim 11, wherein said polyglycerin has a polymerization degree of 6 to 10.

* * * * *